US012762532B2

(12) United States Patent
Rajpal

(10) Patent No.: US 12,762,532 B2
(45) Date of Patent: Oct. 13, 2026

(54) TRANSACTION COORDINATION ACROSS SERVICES

(71) Applicant: Salesforce, Inc., San Francisco, CA (US)

(72) Inventor: Mandeep Singh Rajpal, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 193 days.

(21) Appl. No.: 18/663,361

(22) Filed: May 14, 2024

(65) Prior Publication Data

US 2025/0356335 A1 Nov. 20, 2025

(51) Int. Cl.
*G06Q 20/22* (2012.01)

(52) U.S. Cl.
CPC .................................... *G06Q 20/29* (2013.01)

(58) Field of Classification Search
None
See application file for complete search history.

(56) References Cited

U.S. PATENT DOCUMENTS 10,489,787 B2 * 11/2019 Sheard .................. G06Q 20/40
2020/0228418 A1 * 7/2020 Chaloupka .............. G06F 9/466
2024/0126745 A1 * 4/2024 Krishnaswamy ... G06F 16/2343

OTHER PUBLICATIONS

Thread, Wikipedia, https://web.archive.org/web/20230522124219/https://en.wikipedia.org/wiki/Thread_(computing),_wayback machine, May 22, 2023 (Year: 2023).*

Roy, "Microservices Design pattern: SAGA", Medium, Jun. 2, 2024, https://medium.com/@adrikaroy/microservices-design-pattern-saga-c0f27ab3a159 (Year: 2024).*

* cited by examiner

*Primary Examiner* — David P Sharvin
(74) *Attorney, Agent, or Firm* — Butzel Long

(57) ABSTRACT

Systems, devices, and techniques are disclosed for transaction coordination across services. A service including virtual threads receives a transaction that is part of a multi-part transaction. The service determines the transaction does not already exist in transaction state data. The service updates the status of the transaction in the transaction state data to pending. The service processes the transaction. The service updates the status of the transaction in the transaction state data to completed. The service uses receives at and endpoint a request for the status of the transaction. The service responds to the request for the status of the transaction. The service sends a request for status to an endpoint another service that is processing another transaction of the multi-part transaction. The service receives a response from the another service of a status of completed.

20 Claims, 6 Drawing Sheets

TRANSACTION COORDINATION ACROSS SERVICES

BACKGROUND

The Saga design pattern may be used in microservices architectures for managing complex, multi-part transactions across multiple services. The use of Saga design patterns may ensure data consistency across distributed services. Sagas may be used to handle business processes that involve multiple steps where each of the steps may involve modifying data in different microservice. Current implementations of Saga design patterns, such as through the use of message queues, two-phase commit, and API orchestrated gateways, may be complex, dependent on a single point-of-failure, incur operational overhead, and/or involve processing delays due to interdependencies.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
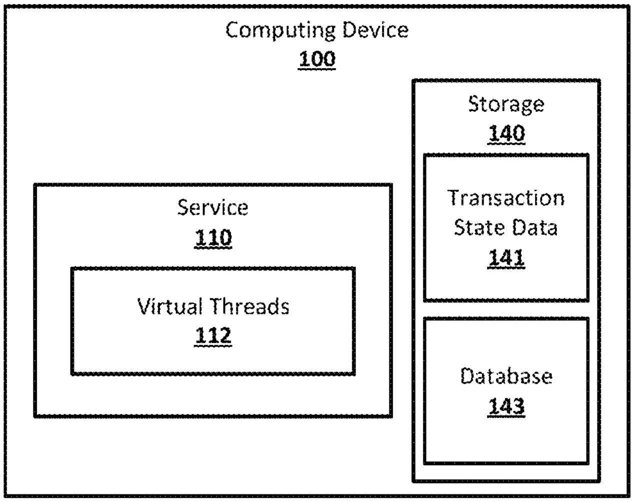
FIG. 1 shows an example system suitable for transaction coordination across services according to an implementation of the disclosed subject matter.

Techniques disclosed herein enable transaction coordination across services, which may allow for multi-part transactions to be completed across distributed services. Services that are part of a multi-part transaction may receive their individual transactions from the multi-part transaction. The services may determine whether their transactions already exist in their transaction state data. The services may update the status of their transactions in their transaction state data to pending. The services may process their transactions. The services may update the status of their transactions in their transaction state data to completed. The services may send requests for transaction statuses to each other's endpoints and may receive from each other requests for the status of their transactions. The services may respond to the requests with the status of their transactions from their transaction state data and may receive the responses from the services to which they've sent requests.

Services that are part of a multi-part transaction may receive their individual transactions from the multi-part transaction. A multi-part transaction may involve multiple individual transactions that may need to be processed across different services, for example, within a microservices architecture. The multi-part transaction may only complete successfully if all of the individual transactions of the multi-part transaction complete successfully. If any of the individual transactions of the multi-part transaction fails to complete successfully, the multi-part transaction may fail. A multi-part transaction may be, for example, a food delivery ordering transaction which may involve individual transactions for ordering, payment, food preparation, and delivery. Individual transactions from a multi-part transaction may be received at the appropriate service for the transaction. The services may be distributed across any number of computing devices and systems, and may, for example, be microservices hosted in any number of cloud computing server systems. For example, the individual transactions from a multi-part food delivery ordering transaction may be sent to an ordering service, a payment service, a food preparation service, and a delivery service. The ordering service may be responsible for processing the food order, the payment service may be responsible for processing the payment for the food order, the food preparation service may be responsible for processing the sending of the food order to the restaurant responsible for preparing the food, and the delivery service may be responsible for processing the coordination of the food delivery. The services may receive their individual transactions from any suitable source. For example, the multi-part transaction may originate from a client application running on a computing device, which may generate and send the individual transactions to the appropriate services, or may send the multi-part transaction to a service which may then generate and send the individual transactions to the appropriate services. The services may be capable of spawning green threads to handle the processing of any of the processing tasks for the services. Green threads may be, for example, virtual threads that are both managed and scheduled outside of any operating system on which the green thread is spawned. Green threads may, for example, by managed and scheduled by either virtual machines or runtime libraries, which may allow for the number of green threads running concurrently to be greater than the number of operating system threads that could run concurrently in the same computation environment.

The services may determine whether their transactions already exist in their transaction state data. Services may maintain transaction state data. The transaction state data may be maintained in the form of a table or any other suitable data structure. The transaction state data may include a locking mechanism to maintain atomicity of the status of the transactions. Individual transactions sent to a service may be identifiable in any suitable manner, including, for example, by a unique identifier assigned to the transaction. Upon receiving a transaction to process, a service may check its transaction state data to ensure that the transaction is not a duplicate of a transaction that already exists in the transaction state data. If the transaction is not a duplicate, the service may the transaction, for example, the unique identifier for the transaction, to the transaction state data. The service may update the status of the transaction in the transaction state data to "pending" or any other suitable state that indicates that the transaction has been received and is ready to be processed by the service. If the transaction is a duplicate, for example, a transaction with the same unique identifier is in the service's transaction state data, then the service may discard it as a duplicate and continue processing the original transaction that was previously added to the transaction state data. Services may maintain their own, separate, transaction state data, using separate data structures that may not be directly accessible by other services. A service may spawn a virtual thread, such as a green thread, to determine whether a received transactions already exists in its transaction state data and update the transaction state data as appropriate. A service may spawn any number of virtual threads, for example, green threads, concurrently to handle any number of concurrently received transactions.

The services may process their transactions. Once a service has determined that the transaction it received is not a duplicate of a transaction already in the service's transaction state data the service may process the transaction. The processing of the transaction may include, for example, updating any suitable databases to which the service has access with the transaction. The updating of the databases may include adding, removing, or modifying any suitable records in the database. A service processing a transaction may include the service sending data to applications running on computing devices separate from the any computing device running the service. For example, a service processing a transaction for food preparation may send the food order to a computing device located at the restaurant that may be in communication with the service processing the food preparation transaction. The computing device may run an application specific to the food delivery order multi-part transaction. Processing a transaction may also include waiting for data input from, for example, applications running on computing devices separate from the any computing device running the service. For example, a transaction for food preparation may not be completed until a worker at the restaurant preparing the food inputs an indication that the food preparation is complete to a computing device located at the restaurant that may be in communication with the service processing the food preparation transaction. Processing a transaction for payment may not be completed until a computing device of a payment processor associated with the method of payment used has sent an approval of the payment to the payment service. For some transactions, a service may delay processing the transaction until the service has received an indication from another service that is has completed its own transaction. For example, a food preparation transaction that is part of food delivery ordering transaction may not be started until an ordering transaction and a payment processing transaction that are part of the same food delivery ordering transaction are completed. A service may spawn a virtual thread, such as a green thread, to process a transaction. A service may spawn any number of virtual threads, for example green threads, concurrently to process any number of concurrent transactions.

The services may send requests for transaction statuses to each other's endpoints and may receive from each other requests for the status of their transactions. At any point during the processing of a receiving transaction that is part of a multi-part transaction, including after the transaction has been completed, a service may send a request to any other service that is responsible for processing a transaction that is part of the same multi-part transaction. For example, a service processing a payment transaction from a multi-part transaction for food delivery ordering may send requests for the statuses of the ordering food preparation, and delivery transactions to the services responsible for processing those transactions. A request for the status of a transaction may identify the transaction directly, for example, transaction identifier if available, or may identify the transaction using an identifier for the multi-part transaction of which the transaction is a part. Services may make endpoints available for receiving these requests for statuses. Services may send requests for status to the other services responsible for processing transactions from the same multi-part transaction at any suitable time and interval, for example periodically or on-demand, and may do so until they receive responses from all other services in the multi-part transactions indicating that their transactions are completed or a response from one other service indicating that its transaction has failed. A service may spawn a virtual thread, such as a green thread, to send a request for the status of a transaction to another service. A service may spawn any number of virtual threads, for example green threads, concurrently to request the statuses of any number of transactions from any number of other services that are responsible for processing transactions from the same multi-part transactions.

The services may respond to the requests with the status of their transactions from their transaction state data and may receive the responses from the services to which they've sent requests. A service that has received a request at its endpoint for the status of a transaction that it is processing may respond to the request. The service may determine the status of the transaction by checking its transaction state data and may then send this status back to the service that sent the request. Services that have sent requests for transaction statuses may receive responses to the requests that include the statuses of any transactions whose status was requested. Communication between services may occur in any suitable manner, using any suitable communications protocols over any suitable forms of interprocess or network communication. A service may spawn a virtual thread, such as a green thread, to respond to a request for the status of a transaction received from another service. A service may spawn any number of virtual threads, for example green threads, concurrently to respond to requests for the statuses of any number of transactions received from any number of other services that are responsible for processing transactions from the same multi-part transactions. A service may spawn a virtual thread, such as a green thread, to receive a response to a request for the status of a transaction from another service or may use the same virtual thread that was used to send the request.

The services may implement retry logic and circuit breakers when sending out requests for statuses of transactions to other services. If a service does not receive any response to a request for status sent to another service within a specified timeout period, the service may retry by resending the request. A service may implement a circuit breaker that may prevent the service from resending a request that has already failed some threshold number of times. A request that fails a threshold number of times may be used by the service as an indication that the transaction whose status was being requested has failed, and the service may then consider the entire multi-part transaction to have failed.

The services may update the status of their transactions in their transaction state data to completed. When a service has completed processing its transaction, the service may update the status of its transaction to "completed", or any other suitable state indicating that the processing of the transaction has been completed, in its transaction state data. A service may have completed processing a transaction when, for example, the service has made any appropriate database updates for the transaction. The entirety of a multi-part transaction may not be considered completed until all of the individual transactions that make up the multi-part transaction are completed and have their statuses updated to "completed." A service may spawn a virtual thread, such as a green thread, to update the status of a transaction. A service may spawn any number of virtual threads, for example green threads, concurrently to update the statuses of any number of concurrent transactions.

The services may update the status of their transactions in their transaction state data to compensated and may compensate the transactions. When a transaction being processed by a service fails or times out for any reason or is part of a multi-part transaction in which another transaction on another service has failed or timed out, the service may update the status of the transaction in the transaction state data to "compensated" and may initiate compensation of the transaction. A transaction may fail when, for example, the transaction relies on input from another computing device to be completed and either does not receive the input within a specified time period, timing out the transaction, or receives input indicating that the transaction cannot be completed. For example, a transaction for food preparation may fail if a worker at the restaurant preparing the food inputs to a computing device located at the restaurant that may be in communication with the service processing the food preparation transaction an indication that the food preparation cannot be completed due to items being out of stock, or fails to input an indication that the food preparation has been completed within a specified timeout period. Compensation of a transaction may include rolling back the transaction, restoring any databases modified by the transaction to their previous state. Compensation may be done by a service through, for example, an API call. A transaction may be compensated, and have its status changed to "compensated" if even if it has already been completed when, for example, another transaction that is part of the same multi-part transaction has failed. A service may determine a transaction needs to be compensated due to another transaction that is part of the same multi-part transaction failing when, for example, the service receives a response to a request for the status of another transaction from the multi-part transaction that indicates the status of that transaction as "compensated," or when a threshold number of requests for the status of another transaction from the multi-part transaction fail. This may ensure that if any transaction that is part of a multi-part transaction fails and is compensated, all of the other transactions that are part of that multi-part transaction will also be compensated. A service may spawn a virtual thread, such as a green thread, to update the status of a transaction and handle compensation of a transaction. A service may spawn any number of virtual threads, for example green threads, concurrently to update the statuses and handle the compensation of any number of concurrent transactions.

FIG. 1 shows an example system suitable for transaction coordination across services according to an implementation of the disclosed subject matter. A computing device 100 may be, for example, the computer 20 as described in FIG. 7, or components thereof. The computing device 100 may include any number computing devices, each of which may include any suitable combination of central processing units (CPUs), graphical processing units (GPUs), and tensor processing units (TPUs). The computing device 100 may be distributed over any geographic area, and may, for example, include geographically disparate computing devices connected through any suitable network connections. The computing device 100 may be, or be a part of, a cloud computing server system that may support multi-tenancy.

The computing device 100 may include a service 110. The service 110 may be any suitable combination of hardware and software on the computing device 100 that may implement a service, for example, as part of a microservice architecture that may run on the computing device 100. The service 100 may be any service used to process transactions from multi-part transactions. For example, the service 100 may be an ordering service, payment processing service, restaurant service, or delivery service that may process the appropriate individual transaction from a multi-part transaction for ordering food delivery. The computing device 100, which may be, for example, a cloud computing server system, may host any number of services that may process parts of the same multi-part transaction as the service 110.

The service 119 nay include virtual threads 112. The virtual threads 112 may be any suitable virtual threads, including, for example, green threads, that may be spawned by the service 110 as needed to handle the processing of various tasks performed by the service 110. For example, the service 110 may spawn the virtual threads 112 to handle the processing of a transaction, sending requests for transaction statuses to other services, receiving responses to the requests for status transactions, receiving and responding to request for transaction statuses from other services, performing database updates during the processing of a transaction, and communicating with other external systems such as client systems running client applications during the processing of a transaction. The service 110 may spawn any number of the virtual threads 112, as limited only be the computational resources of the computing device 100 that are available to the service 110, to concurrently handle the tasks of the service 110 which may concurrently process any number of transactions. The service 110 may kill any of the virtual threads 112 at any time or set any suitable termination conditions for the virtual thread 112. The virtual threads 112 may run on any suitable hardware of the computing device 100.

The storage 140 may be any suitable combination of hardware and software for storing data on any suitable physical storage mediums. The storage 140 may store transactions state data 141 and database 143. The transaction state data 141 may store, in any suitable format and data structure, the statuses of the transactions processed by the service 110, including transactions that have already been completed. The transaction state data 141 may be accessible to, and modifiable by, the service 110, but not by any other services that may process other transactions that are part of the same multi-part transaction as a transaction processed by the service 110. The database 143 may be database that stores data, for example, records, generated and modified based on transactions processed by the service 110. For example, if the service 110 is a payment processing service, the database 143 may store records of payments processed by the service 110.

Figure 2:
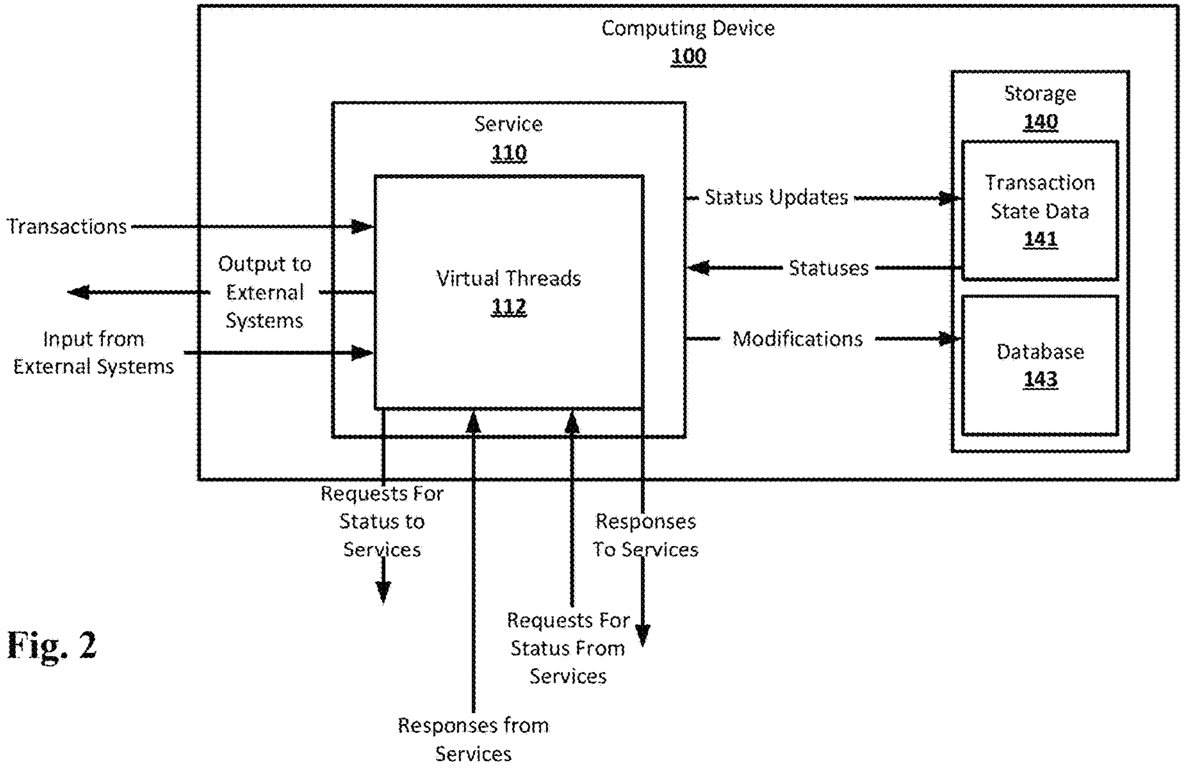
FIG. 2 shows an example arrangement suitable for transaction coordination across services according to an implementation of the disclosed subject matter.

FIG. 2 shows an example arrangement suitable for transaction coordination across services according to an implementation of the disclosed subject matter. Transactions may be received at the service 110. The transactions may be individual transactions from multi-part transactions and may be of a type that the service 110 may be responsible for processing. For example, the service 110 may be a payment processing service and the transactions may be payment transactions. The service 110 may receive any number of transactions from any suitable computing device or system, including from other services on the computing device 100 and may process any number of the received transactions concurrently. The service 110 may receive transactions while still processing previously received transactions. The service 110 may spawn virtual threads, such as the virtual threads 112, to handle the processing of the received transactions concurrently.

The service 110 may send output to external systems. When processing transactions, the service 110 may need to send data as output to computing devices or systems that are external to the service 110 and the computing device 100. For example, the service 110 may be payment processing service and may need to process payment transactions by sending payment data to the systems of a financial institution, for example, credit card company, that is responsible for approving the payment method used in the payment transaction. The service 110 may spawn virtual threads, such as the virtual threads 112, to handle the sending of output to the external systems concurrently for any number of transactions being processed by the service 110.

The service 110 may receive input from external systems. When processing transactions, the service 110 may need to receive data as input from computing devices or systems that are external to the service 110 and the computing device 100. The data received as input may be, for example, from an external system to which the service 110 sent data as output. For example, the service 110 may, after sending payment data to the systems of a financial institution, receive data from the systems of the financial institution indicating whether or not the payment in the payment data was approved. A transaction may fail if, for example, data that is needed from an external system is not received, or data received from the external system indicates that the transaction should not proceed, for example data from a financial institution that indicates that a payment is not approved. The service 110 may spawn virtual threads, such as the virtual threads 112, to handle the receiving of input concurrently from the external systems for any number of transactions or may use the same virtual threads that send output data to external systems to receive input from those external systems, for example, with the same virtual thread that sent output to an external system receiving input from that external system.

The service 110 may send requests for statuses to other services. A transaction processed by the service 110 may be an individual transaction from a multi-part transaction that includes other individual transactions processed by other services. All transactions from a multi-part transaction need to be completed successfully in order for the multi-part transaction to complete successfully. Failure of any individual transaction from the multi-part transaction may necessitate those other transactions from that multi-part transaction be compensated and any changes made to databases by those transactions rolled back. The service 110 may determine the statuses of other transactions from a multi-part transaction for which the service 110 is processing an individual transaction by sending requests for statuses to the services processing those other transactions. The other services may operate in a similar manner to the service 110, for example, though may process different types of transactions than the service 110. The other services may be located on the computing device 100 or on any other computing device or system external to the computing device 100. The service 110 may send requests for status any number of times, either at suitable intervals or on an on-demand basis. The requests may be sent to endpoints exposed by other services. The service 110 may spawn virtual threads, such as the virtual threads 112, to concurrently handle the sending of requests for statuses.

The service 110 may receive from other services responses to requests for statuses sent by the server 110. The responses may include the statuses of transactions whose statuses were requested by the service 110. The service 110 may determine whether to compensate a transaction from a multi-part transaction based on the statuses for the other transactions from that multi-part transaction as received from the other services that are processing those transactions. For example, if the service 110 receives a status of "compensated" for any of the other transactions from a multi-part transaction, the service 110 may compensate its transaction from that multi-part transaction. The service 110 may compensate a transaction even if the service 110 has already completed processing the transaction. If the service 110 receives a status that is neither "completed" nor "compensated" for all the other transactions in a multi-part transaction, the service 110 may continue to process its transaction from that multi-part transaction as the other transactions may still be pending, being processed by their respective services. If the service 110 receives a status of "completed" for all of the other transactions in a multi-part transaction, the service 110 may complete its transaction if it has not done so already in order to complete the multi-part transaction. If the service 110 does not receive a status from another service to which the service 110 sent a request within a specified time period, the service 110 may consider the request to have timed out and resend the request. The service 110 may resend a request a specified number of times when no responses are received before considering the transaction being processed by the other service to have failed. The service 110 may then compensate its own transaction from the multi-part transaction. The requests may be sent to endpoints exposed by other services. The service 110 may spawn virtual threads, such as the virtual threads 112, to concurrently handle the receiving of responses to requests for statuses or may use the same virtual threads that send the requests for statuses to other services to receive responses from those other services, for example, with the same virtual thread that sent a request to a service receiving the response from that service.

The service 110 may receive requests for statuses of transactions from other services. A request for the status of a transaction being handled by the service 110 received from another service may be similar to a request for the status of a transaction sent by the service 110 to another service. The requests may be received by the service 110 at an endpoint exposed by the service 110. A request received by the service 110 from another service may be for the status of a transaction that is from a multi-part transaction for which the another service is also processing a transaction. This may allow all of the services that are responsible for transactions from the same multi-part transaction request statuses from each other in order to determine whether any of the transactions in the multi-part transaction has failed or if they have all completed successfully. The service 110 may receive any number of requests for statuses from any other services that are responsible for processing transactions from the same multi-part transactions as transactions being processed by the service 110. The service 110 may spawn virtual threads, such as the virtual threads 112, to concurrently handle the receiving of requests for statuses.

The service 110 may send to other services responses to requests for statuses received by the server 110 from the other services. The responses may include the statuses of transactions whose statuses were requested by the other services as obtained by the service 110 from the transaction state data 141. For example, the service 110 may have received a request for the status of a transaction that is part of a multi-part transaction and that is being processed by the service 110. The request may have been received from another service that is responsible for processing another transaction from the same multi-part transaction as the transaction being processed by the service 110. The request may include identifier for the multi-part transaction, or for the transaction being processed by the service 110. The service 110 may use the identifier to check the transaction state data 141 for the current status of the transaction that corresponds to the identifier. This status may then be sent to the another service that requested the status of the transaction. The service 110 may send responses to all of the requests for status received from other services. The service 110 may spawn virtual threads, such as the virtual threads 112, to handle the sending of responses concurrently to the other services, may use the same virtual threads receive the requests for statuses to send the responses to the requests for statuses, for example, with the same virtual thread that received a request for the status of a transaction from a service sending the response including the requested status to that service.

The service 110 may update the status of transactions in the transaction state data 141. As the service 110 receives and processes transaction, the service 110 may update the statuses for the transactions in the transaction state data 141 to reflect their current statuses. For example, upon receiving a transaction that is part of a multi-part transaction, the service 110 may check the transaction state data 141 to determine if the transaction is a duplicate. If the transaction is not a duplicate, the service 110 may add the transaction to the transaction state data 141 and update the transaction's status to "pending", or any other suitable indicator that the service 110 is processing the transaction. When the service 110 has completed processing the transaction, the service 110 may update the status of the transaction in the transaction state date 141 to "completed", or any other suitable indicator that the service 110 has completed processing the transaction. If the processing of the transaction fails for any reason, including failure of the multi-part transaction after the service 110 has completed processing the transaction, the service 110 may update the status of the transaction in the transaction state data 141 to "compensated", or any other suitable indicator that the transaction 110 has failed and the service 110 has compensated the transaction. The service 110 may spawn virtual threads, such as the virtual threads 112, to handle the updating of transaction statuses concurrently, or the updating may be handled by virtual threads that are responsible for processing the transactions.

The service 110 may make modifications to the database 143. As part of processing a transaction, the service 110 may update the database 143 by adding, removing, or modifying records within the database 143. The modifications made to the database 143 by the service 110 may be based on the nature of the transaction being processed by the service 110. The service 110 may spawn virtual threads, such as the virtual threads 112, to handle modifications to the database 143 based on transactions concurrently, or the modifications may be handled by virtual threads that are responsible for processing the transactions.

Figure 3:
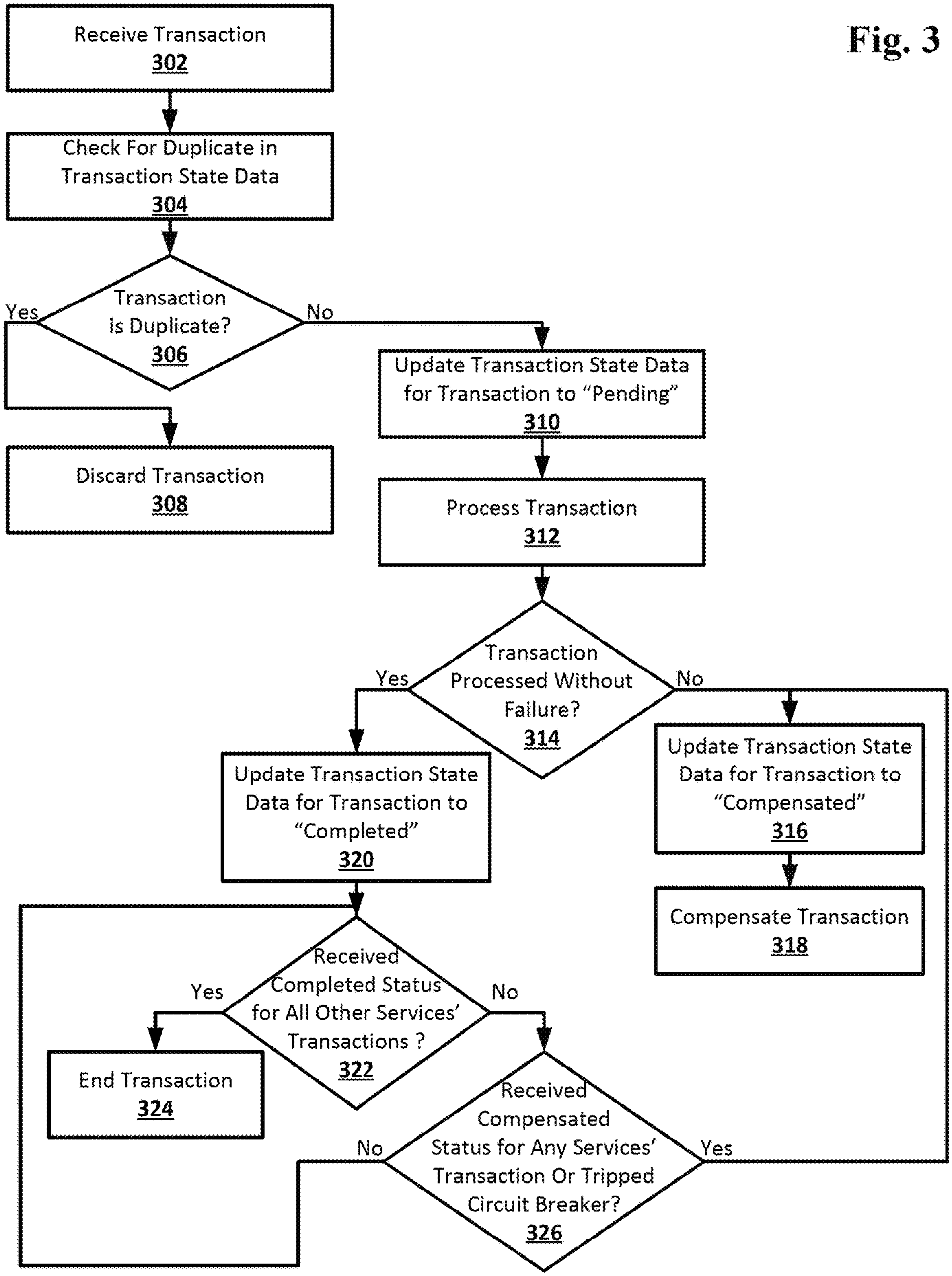
FIG. 3 shows an example procedure suitable for transaction coordination across services according to an implementation of the disclosed subject matter.

FIG. 3 shows an example procedure suitable for transaction coordination across services according to an implementation of the disclosed subject matter. At 302, a transaction may be received. For example, the service 110 on the computing device 100 may receive a transaction that is part of a multi-part transaction which may have other transactions being processed by other services. The transaction may be received from any suitable source. The transaction may be received with any suitable identifiers that may allow the service 110 to identify the transaction and the multi-part transaction to other services. The transaction may be received by, for example, a virtual thread of the virtual threads 112.

At 304, duplicates may be checked for in the transaction state data. For example, the service 110 may check the transaction state data 141 to determine if the received transaction is a duplicate of a transaction already in the transaction state data 141. Transactions may have identifiers that may be unique to each transaction. The service 110 may check the identifier of a received transaction to see if a transaction with that identifier is already in the transaction state data 141. The duplicate checking may be performed by, for example, a virtual thread of the virtual threads 112.

At 306, if the transaction is a duplicate, flow may proceed to 308 where the transaction may be discarded. Otherwise, flow may proceed to 310. For example, if the service 110 determines that a transaction with the same identifier as a just received transaction is already in the transaction state data 141, the just received transaction may be a duplicate and may be discarded.

At 308, a transaction may be discarded. For example, the service 110 may have determined that a received transaction is a duplicate. The service 110 may discard the receive transaction. This may prevent the processing of duplicate transactions.

At 310, transaction state data may be updated to pending. For example, the service 110 may have determined that a received transaction is not a duplicate. The service 110 may add the transaction to the transaction state data 141 and may update the status of the transaction of the "pending" or any other suitable indicator that the service 110 is processing the transaction and the transaction has not been completed or failed. The transaction state data 141 may be updated by, for example, a virtual thread of the virtual threads 112.

At 312, the transaction may be processed. For example, the service 110 may process the transaction. The service 110 may process a transaction in any suitable based on any suitable properties of the transaction. For example, processing a transaction may involve sending data to any number of external systems, receiving data from any number of external systems, receiving data from the database 143 or any other database accessible to the computing device 100, modifying the database 143, and performing any suitable computation on any data from the transaction or the external systems. While processing a transaction, the service 110 may send requests for statuses of transactions to services responsible for processing other transactions from the same multi-part transaction as the transaction being processed by the service 110 and receive responses to those sent requests, receive requests for the status of the transaction from other services responsible for processing other transactions from the same multi-part transaction and send responses to those requests. The service 110 spawn any suitable number of virtual threads to handle the processing of a transaction, including any communications with external systems and other services.

At 314, if the transaction was processed without failure, flow may proceed to 320. Otherwise, flow may proceed to 316. For example, a transaction being processed by the service 110 may fail if the service 110 is unable to complete processing the transaction for any reason, including not receiving data needed to process the transaction from external systems or databases accessible to the service 110, not receiving a response to a request for the status of another transaction from the same multi-part transaction as the transaction being processed by the service 110 after a threshold number of requests for the status are sent without receiving a response within a specified time period triggering a circuit breaker, or receiving a response to a request for the status of another transaction from the same multi-part transaction as the transaction being processed by the service 110 indicating that the status of the another transaction is "compensated" or some other status indicating failure of the another transaction.

At 316, the transaction's status may be updated to "compensated." For example, the service 110 may have determined that the transaction has failed. The service 110 may update the status of the transaction in the transaction state data 141 to "compensated", or any other suitable indicator that the transaction has failed and been compensated. The status of the transaction may be updated by, for example, a virtual thread of the virtual threads 112.

At 318, the transaction may be compensated. For example, once the service 110 has determined that a transaction has failed the transaction may be compensated. The service 110 may compensate a transaction in any suitable manner. For example, the service 110 may roll back any changes that were made to the database 143, or any other databases, during the processing of the transaction, returning the database 143 to the state it was in prior to the service 110 beginning processing of the transaction.

At 320, the transaction's status may be updated to "completed." For example, the service 110 may have completed processing the transaction without failure. The service 110 may update the status of the transaction in the transaction state data 141 to "completed", or any other suitable indicator that the transaction has been completed. The status of the transaction may be updated by, for example, a virtual thread of the virtual threads 112.

At 322, if a "completed" status has been received for all other services' transactions from the multi-part transaction, flow may proceed to 324. Otherwise, flow may proceed to 326. For example, after the service 110 has finished processing its transaction from a multi-part transaction, the service 110 may determine if it has already received a "completed" status in response to status requests sent to the other services processing the other transaction from the multi-part transactions. If the service 110 received responses from all the other services processing the other transactions from the multi-part transaction indicating that those other services successfully completed processing their transactions from the multi-part transactions, this may indicate that the entire multi-part transaction has been completed and none of the transactions will need to be compensated. Otherwise, the service 110 may have either received a status other than "completed" from any of the other services or may not have a received a response to a status request sent to one of the other services but may have not yet exhausted the number of retries for sending the status request.

At 324, the transaction may end. For example, the service 110 may have successfully processed its transaction from a multi-part transaction and may have received statuses from all other services processing all other transactions from the multi-part transaction indicating that processing of those transactions also completed successfully. This may indicate that the entire multi-part transaction has been completed successfully and none of the transactions will need to be compensated. The service 110 may end any activity related to the transaction, including, for example, killing any virtual threads spawned to process or handle communications for the transaction.

At 326, if a status of "compensated" is received for any other services' transaction from the multi-part transaction or a circuit breaker has been tripped due to exhaustion of retry attempts for sending status requests, flow may proceed to 316 where the transaction may be compensated. Otherwise, flow may proceed to 326, where service 110 may check to see if it has now received a status of "completed" from all other services processing other transactions from the multi-part transaction and may cycle between 324 and 326 until all "completed" statues are received, a "compensated" status is received, or a circuit breaker is tripped. For example, the service 110 may have either received a status of "compensated" or other indication that a transaction from the multi-part transaction has been compensated from any of the other services' processing transaction from the multi-part transaction or may have tripped a circuit breaker by sending one of the other services a request for status a threshold number of times without receiving a response before each request timed out. This may indicate that one of the other services has failed to process its transaction from the multi-part transaction and all of the transactions from the multi-part transaction need to be compensated. Otherwise, the service 110 may continue to cycle wait to receive responses to status requests sent to the other services processing transactions from the multi-part transaction. This may result in the service 110 receiving "completed" statuses for all of the other transactions, receiving a "compensated" status for any of the other transactions, or tripping a circuit breaker when the service 110 resends a request for status to another service a threshold number of times without receiving a response within the specified timeout period for the requests.

Figure 4:
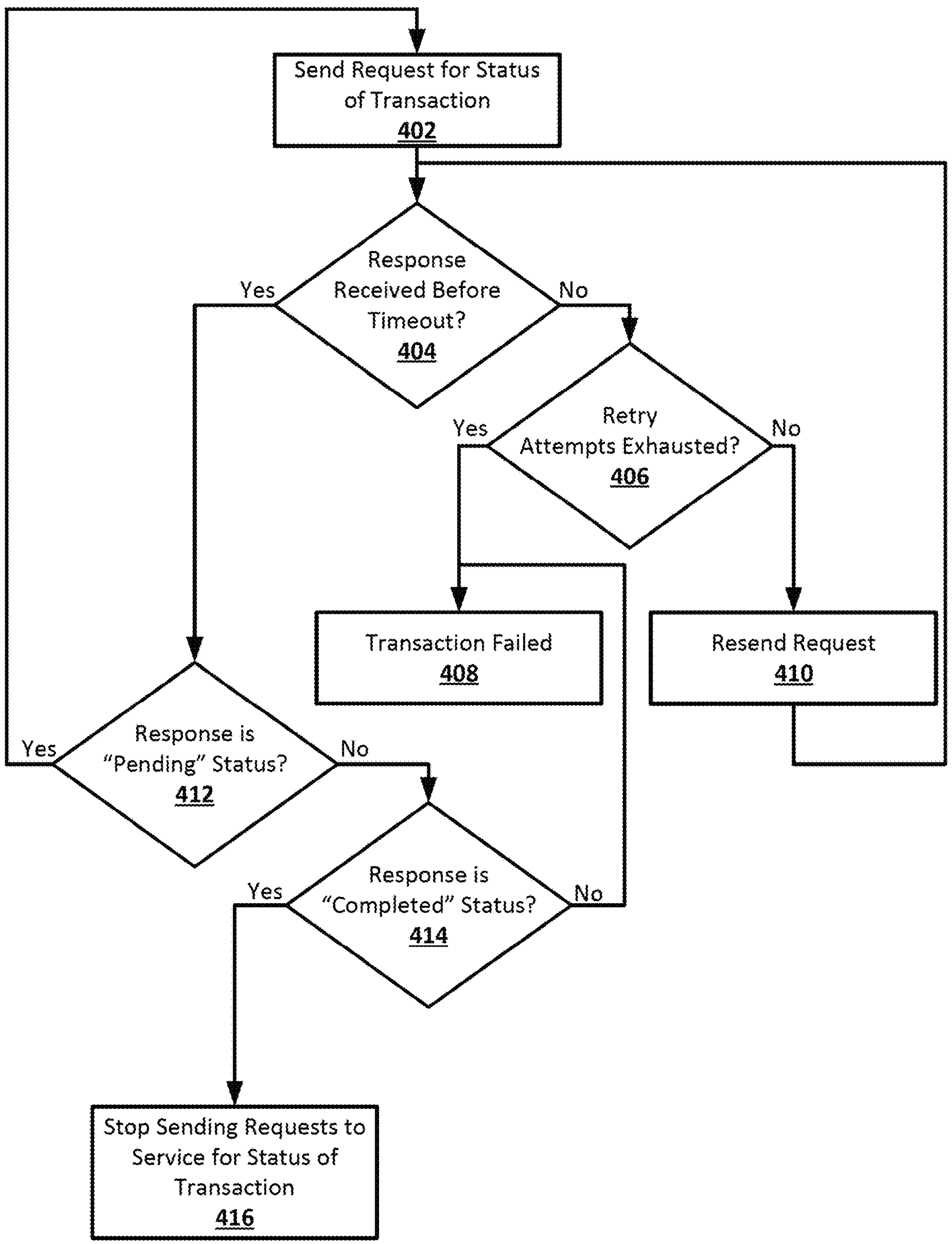
FIG. 4 shows an example procedure suitable for transaction coordination across services according to an implementation of the disclosed subject matter.

FIG. 4 shows an example procedure suitable for transaction coordination across services according to an implementation of the disclosed subject matter. At 402, a request for status of a transaction may be sent. For example, the service 110, while processing a transaction from a multi-part transaction, may send to another service a request for the status of another transaction from the same multi-part transaction being processed by that another service. The service 110 may send requests for status to all other services processing transactions from the same multi-part transaction as the transaction being processed by the service 110. Requests may be sent by, for example, virtual threads of the virtual threads 112.

At 404, if a response to a request for status is received before the request times out, flow may proceed to 412. Otherwise, flow may proceed to 406. For example, requests for status sent by the service 110 to other services may have specified timeout periods for receiving a response. If the service 110 sends a request for status to another service and does not receive a response from that another service within the timeout period, the request may be considered to have timed out.

At 406, if the retry attempts are exhausted, flow may proceed 408. Otherwise, flow may proceed to 410. For example, the service 110 may implement a circuit breaker for re-sending requests for status when no response is received to the requests within the timeout period for the request. The circuit breaker may allow the service 110 a threshold number of retry attempts at sending the request for status before being tripped. If the service 110 has sent a request for status to the same service the threshold number of times without receiving a response, resulting in all the requests timing out, this may trip the circuit breaker, and the service 110 may not attempt to resend the request for status again.

At 408, the transaction may have failed. For example, a threshold number of requests for status sent by the service 110 to another service responsible for processing a transaction from the same multi-part transaction as the transaction being processed by the service 110 may have timed out without a response, tripping the circuit breaker for the service 110. The service 110 may determine that the multi-part transaction has failed, and therefore the transaction being processed by the service 110 has failed. This may result in the service 110 updating the status of its transaction to "compensated" and compensating the transaction.

At 410, the request for status may be resent. For example, a request for status sent by the service 110 to another service may have timed out, but the service 110 may not yet have had its circuit breaker tripped due to exhausting retry attempts at sending the request. The service 110 may resend the request for status to the same service the original request for status was sent to and may again wait the length of the timeout period to receive a response to the request for status. Requests may be sent by, for example, virtual threads of the virtual threads 112.

At 412, if the response to the request for status is "pending", flow may proceed to 402. Otherwise, if the response is any other status, flow may proceed to 414. For example, the service 110 may receive a response from another service to which a request for status of "pending", or any other status that indicates that the transaction whose status was requesting is still pending. This may indicate that the service 110 should request the status of the transaction from that service again at a later time, either at a specified interval or in an on-demand manner.

At 414, if the response to the request for status is "completed", flow may proceed to 416. Otherwise, flow may proceed to 408. For example, the service 110 may receive a response from another service to which a request for status was sent of "completed", or any other status that indicates that the transaction whose status was requesting has had its processing completed successfully. Otherwise, if the received status is not "pending" or "completed", the status may be "compensated", or any other status that indicates that the transaction has been compensated. This may indicate to the service 110 that the multi-part transaction has failed and therefore the transaction being processed by the service 110 should have its status updated to "compensated" and should be compensated.

At 416, requests for status of the transaction may no longer be sent to the service that the request for status was initially sent to. For example, the service 110 may have received a status of "completed" in response to a request for the status of a transaction sent to another service. This may indicate that the another service has successfully completed processing its transaction from the multi-part transaction. The service 110 may no longer need to request statuses from that another service for that transaction. The service 110 may continue to send requests to other services that are responsible for processing other transactions from the same multi-part transaction as the now-completed transaction. The service 110 may also continue sending requests to that another service for statuses of other transactions that the another service is processing when those other transactions are parts of multi-part transactions for which the service 110 is also processing a transaction.

Figure 5:
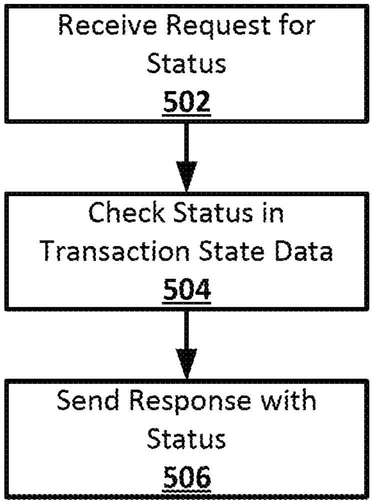
FIG. 5 shows an example procedure suitable for transaction coordination across services according to an implementation of the disclosed subject matter.

FIG. 5 shows an example procedure suitable for transaction coordination across services according to an implementation of the disclosed subject matter. At 502, a request for status may be received. For example, the service 110 may receive a request for the status of transaction that is part of a multi-part transaction and is being processed by the service 110 from another service that is responsible for processing another transaction from that multi-part transaction. The request for the status of the transaction may be received at any time after the service 110 has started processing the transaction and may be received at any time, including after the service 110 has either successfully completed processing or compensated the transaction, until the multi-part transaction has either been completed successfully or failed. The service 110 may receive requests for statuses for any of the transactions that the service 110 may be concurrently responsible for processing. The request may be received by, for example, a virtual thread of the virtual threads 112.

At 504, the transaction status may be checked in the transaction state data. For example, the request for the status of a transaction received by the service 110 may include an identifier for the transaction or the multi-part transaction of which the transaction is a part. The service 110 may use the identifier to check the status of the transaction in the transaction state data 141. The status of the transaction may be checked by, for example, a virtual thread of the virtual threads 112.

At 506, a response with the status may be sent. For example, the service 110 may send a response to the request for status to the service from which the request for status was received. The response may include the status of the transaction whose status was requested, as determined by the service 110 from checking the transaction state data 141. The status may be, for example, "pending", "completed", or "compensated." The response may be sent by, for example, a virtual thread of the virtual threads 112.

Figure 6:
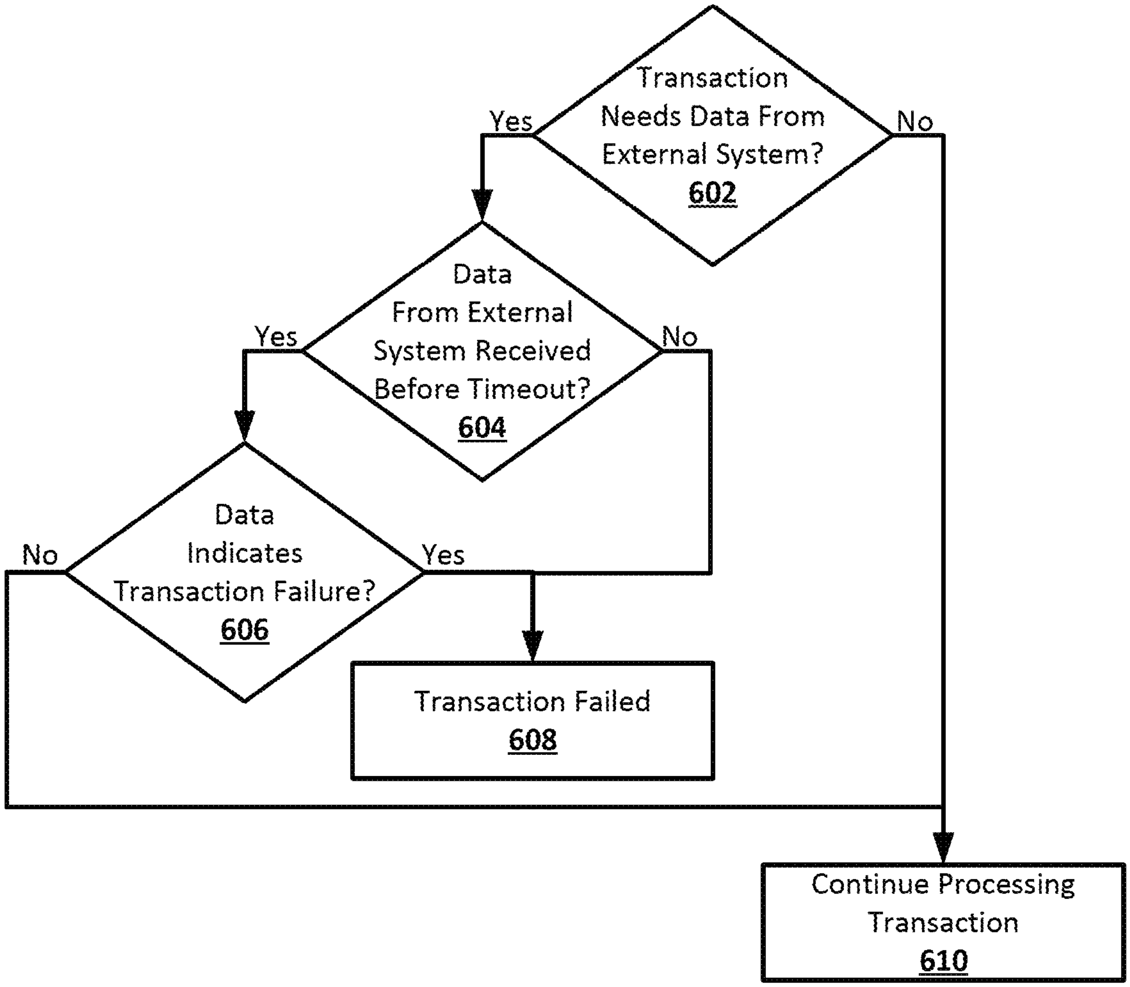
FIG. 6 shows an example procedure suitable for transaction coordination across services according to an implementation of the disclosed subject matter.

FIG. 6 shows an example procedure suitable for transaction coordination across services according to an implementation of the disclosed subject matter. At 602, if a transaction needs data from an external system, flow may proceed to 604. Otherwise, flow may proceed to 610 where the transaction may continue to be processed. For example, a transaction being processed by the service 110 may require data from an external system in order to be processed successfully. The data may be, for example, payment approval from a payment processor system which may be needed to process a payment transaction, an in-stock indication for all items in an order from a store or restaurant system which may be needed to process an order fulfillment or food preparation transaction, or delivery confirmation from a system used by a delivery driver which may be needed to process a delivery transaction. A single transaction may need to receive data from multiple external systems, and may also need to receive data multiple times from the same external system.

At 604, if data from the external system is received before a timeout period expires, flow may proceed to 606. Otherwise, flow may proceed to 808. For example, the service 110 may only wait for a specified timeout period before timing out while waiting for data from an external system that is needed by the service 110 to successfully complete processing a transaction. The timeout period may start when the service 110 sends a request for data to the external system, or at any other suitable time if the service 110 does not need to send a request for the data from the external system in order for the external system to send the data to the service 110. The timeout period may vary based on the type of transaction that is processed by the service 110. For example, if the service 110 processes payment transactions, the timeout period for which the service 110 waits for approval of the payment in the payment transaction from the appropriate payment processor system may be short, for example, less than a minute. If the service 110 processes food preparation transactions, the timeout period for which the service 110 waits for an indication that all of the food items are in stock from the appropriate restaurant system may be longer, for example, a half an hour. If data is not received from the external system before the timeout period expires, the transaction may fail and may be compensated along with all of the other transactions in the multi-part transaction.

At 606, if the data received from the external system indicates that the transaction has failed, flow may proceed to 608. Otherwise, flow may proceed to 610. For example, the service 110 may receive data from an external system that indicates that the transaction that needed the data from the external system has failed. For example, the service 110 may receive data indicating that a payment processor has rejected a payment from a payment transaction being processed by the service 110. This may indicate that the payment transaction has failed and should be compensated along with the other transactions in the same multi-part transaction as the payment transaction.

At 608, the transaction may have failed. For example, the service 110 may have timed out waiting for data from an external system or may have received data indicating a transaction failure from an external system. The service 110 may determine that the transaction has failed. This may result in the service 110 updating the status of its transaction to "compensated" and compensating the transaction.

At 610, the processing of the transaction may continue. For example, the transaction being processed by the service 110 may not need data from an external system or may have received any needed from an external system. The service 110 may continue to process the transaction.

Figure 7:
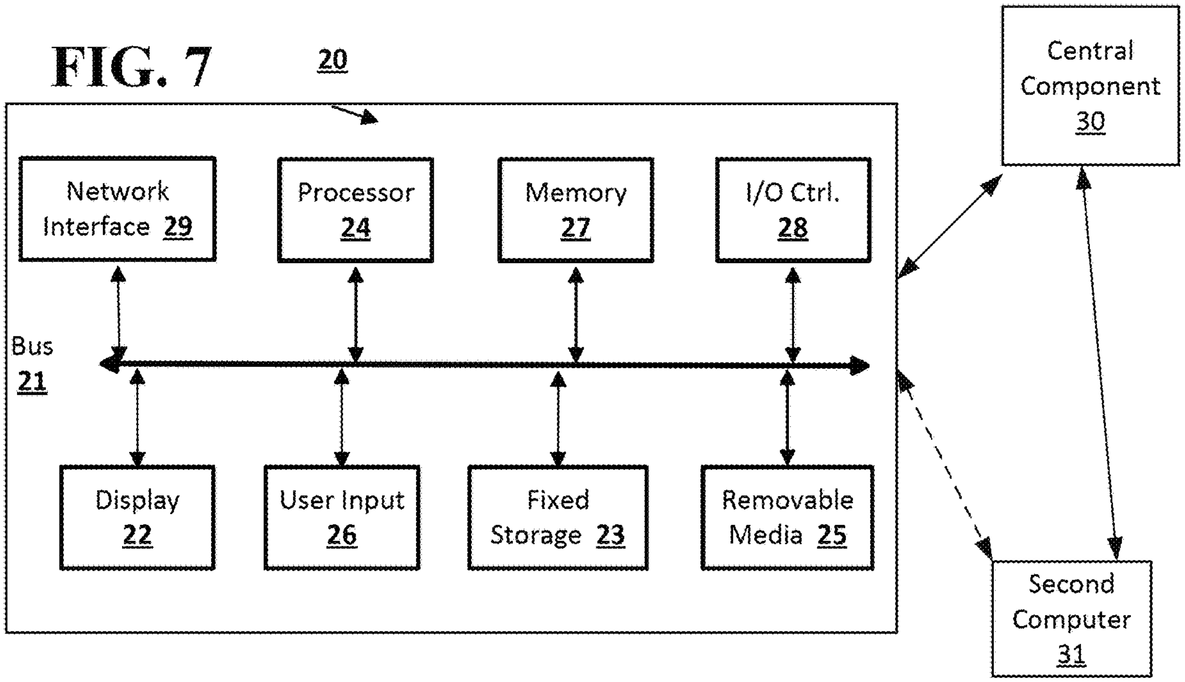
FIG. 7 shows a computer according to an implementation of the disclosed subject matter.

Implementations of the presently disclosed subject matter may be implemented in and used with a variety of component and network architectures. FIG. 7 is an example computer 20 suitable for implementing implementations of the presently disclosed subject matter. As discussed in further detail herein, the computer 20 may be a single computer in a network of multiple computers. As shown in FIG. 7, computer may communicate a central component 30 (e.g., server, cloud server, database, etc.). The central component 30 may communicate with one or more other computers such as the second computer 31. According to this implementation, the information obtained to and/or from a central component 30 may be isolated for each computer such that computer 20 may not share information with computer 31. Alternatively or in addition, computer 20 may communicate directly with the second computer 31.

The computer (e.g., user computer, enterprise computer, etc.) 20 includes a bus 21 which interconnects major components of the computer 20, such as a central processor 24, a memory 27 (typically RAM, but which may also include ROM, flash RAM, or the like), an input/output controller 28, a user display 22, such as a display or touch screen via a display adapter, a user input interface 26, which may include one or more controllers and associated user input or devices such as a keyboard, mouse, WiFi/cellular radios, touchscreen, microphone/speakers and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 enable data communication between the central processor 24 and the memory 27, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 20 can be stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may enable the computer to communicate with other computers via one or more local, wide-area, or other networks, as shown in FIG. 8.

Many other devices or components (not shown) may be connected in a similar manner (e.g., document scanners, digital cameras and so on). Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, removable media 25, or on a remote storage location.

Figure 8:
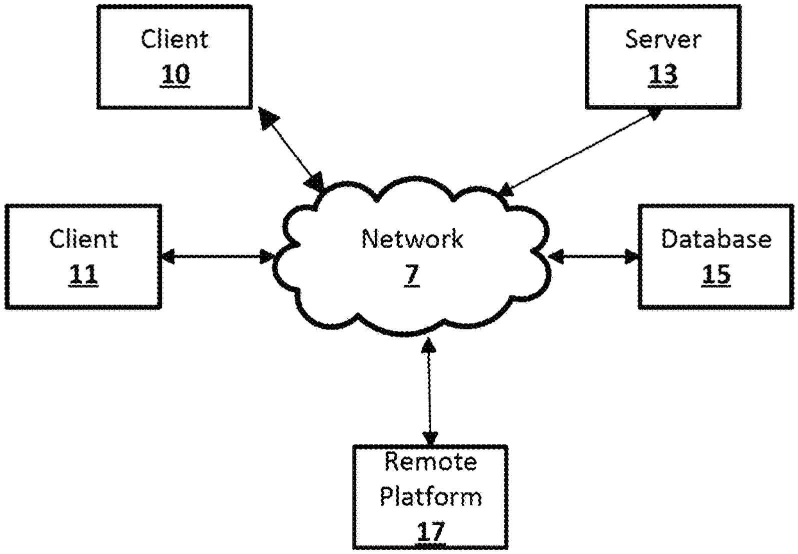
FIG. 8 shows a network configuration according to an implementation of the disclosed subject matter.

FIG. 8 shows an example network arrangement according to an implementation of the disclosed subject matter. One or more clients 10, 11, such as computers, microcomputers, local computers, smart phones, tablet computing devices, enterprise devices, and the like may connect to other devices via one or more networks 7 (e.g., a power distribution network). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. Information from or about a first client may be isolated to that client such that, for example, information about client 10 may not be shared with client 11. Alternatively, information from or about a first client may be anonymized prior to being shared with another client. For example, any client identification information about client 10 may be removed from information provided to client 11 that pertains to client 10.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:

receiving, using a service running on a processor, a transaction that is part of a multi-part transaction, wherein the service comprises virtual threads spawned by the service and running on the processor;

determining, using the service using any of the virtual threads of the service, the transaction does not already exist in transaction state data for the service;

updating, using the service using any of the virtual threads of the service, the status of the transaction in the transaction state data for the service to pending;

processing, using the service using any of the virtual threads of the service, the transaction;

updating, using the service using any of the virtual threads of the service, the status of the transaction in the transaction state data for the service to completed;

receiving, using the service at an endpoint of the service, a request for the status of the transaction;

responding, using the service using any of the virtual threads of the service, to the request for the status of the transaction;

sending, using the service using any of the virtual threads of the service, a request for status to an endpoint of at least one other service that is processing at least one other transaction of the multi-part transaction; and receiving, using the service using at any of the virtual threads, a response from the at least one other service of a status of completed.

2. The computer-implemented method of claim 1, further comprising:

receiving, at the service, a second transaction that is part of a second multi-part transaction;

determining, using the service using any of the virtual threads of the service, the second transaction does not already exist in transaction state data for the service;

updating, using the service using any of the virtual threads of the service, the status of the transaction in the transaction state data for the service to pending;

processing, using the service using any of the virtual threads of the service, the second transaction;

updating, using the service using any of the virtual threads of the service, the status of the second transaction in the transaction state data for the service to completed;

sending, using the service using any of the virtual threads, a request for status to the endpoint of the at least one other service that is processing at least one other transaction of the second multi-part transaction;

receiving, using the service using any of the virtual threads, a response from the at least one other service of a status of compensated; and rolling back, using the service using any of the virtual threads, the second transaction.

3. The computer-implemented method of claim 1, further comprising:

receiving, at the service, a second transaction that is part of a second multi-part transaction;

determining, using the service using any of the virtual threads of the service, the second transaction does not already exist in transaction state data for the service;

updating, using the service using any of the virtual threads of the service, the status of the transaction in the transaction state data for the service to pending;

processing, using the service using any of the virtual threads of the service, the second transaction;

sending, using the service using any of the virtual threads, a request for status to the endpoint of the at least one other service that is processing at least one other transaction of the second multi-part transaction;

determining, using the service, that the request for status has timed out; and re-sending the request for status.

4. The computer-implemented method of claim 3, further comprising:

determining, using the service using any of the virtual threads, that a threshold number of requests for status have been sent to the at least one other service and no response to any of the requests for status have been received; and rolling back, using the service using any of the virtual threads, the second transaction.

5. The computer-implemented method of claim 1, wherein the virtual threads are green threads.

6. The computer-implemented method of claim 1, wherein processing, using the service using any of the virtual threads of the service, the transaction, further comprises sending data to at least one external system.

7. The computer-implemented method of claim 1, wherein processing, using the service using any of the virtual threads of the service, the transaction, further comprises receiving data from at least one external system.

8. A computer-implemented system comprising:

a storage comprising transaction state data; and a processor that receives, with a service running on the processor, a transaction that is part of a multi-part transaction, wherein the service comprises virtual threads, determines, with the service running on the processor using any of the virtual threads of the service, the transaction does not already exist in the transaction state data for the service, updates, with the service running on the processor using any of the virtual threads of the service, the status of the transaction in the transaction state data for the service to pending, processes, with the service running on the processor using any of the virtual threads of the service, the transaction, updates, with the service running on the processor using any of the virtual threads of the service, the status of the transaction in the transaction state data for the service to completed, receives, with the service running on the processor at an endpoint of the service, a request for the status of the transaction, responds, with the service running on the processor using any of the virtual threads of the service, to the request for the status of the transaction, sends, with the service running on the processor using any of the virtual threads, a request for status to an endpoint of at least one other service that is processing at least one other transaction of the multi-part transaction, and receives, with the service running on the processor using at any of the virtual threads, a response from the at least one other service of a status of completed.

9. The computer-implemented system of claim 8, wherein the processor further receives, with the service, a second transaction that is part of a second multi-part transaction, determines, with the service running on the processor using any of the virtual threads of the service, the second transaction does not already exist in transaction state data for the service, updates, with the service running on the processor using any of the virtual threads of the service, the status of the transaction in the transaction state data for the service to pending, processes, with the service running on the processor using any of the virtual threads of the service, the second transaction, updates, with the service running on the processor using any of the virtual threads of the service, the status of the second transaction in the transaction state data for the service to completed, sends, with the service running on the processor using any of the virtual threads, a request for status to the endpoint of the at least one other service that is processing at least one other transaction of the second multi-part transaction, receives, with the service running on the processor using any of the virtual threads, a response from the at least one other service of a status of compensated, and rolls back, with the service running on the processor using any of the virtual threads, the second transaction.

10. The computer-implemented system of claim 8, wherein the processor receives, with the service, a second transaction that is part of a second multi-part transaction, determines, with the service running on the processor using any of the virtual threads of the service, the second transaction does not already exist in transaction state data for the service, updates, with the service running on the processor using any of the virtual threads of the service, the status of the transaction in the transaction state data for the service to pending, processes, with the service running on the processor using any of the virtual threads of the service, the second transaction, sends, with the service running on the processor using any of the virtual threads, a request for status to the endpoint of the at least one other service that is processing at least one other transaction of the second multi-part transaction, determines, with the service running on the processor, that the request for status has timed out, and re-sends the request for status.

11. The computer-implemented system of claim 10, wherein the processor further determines, with the service using any of the virtual threads, that a threshold number of requests for status have been sent to the at least one other service and no response to any of the requests for status have been received, and rolls back, with the service running on the processor using any of the virtual threads, the second transaction.

12. The computer-implemented system of claim 8, wherein the virtual threads are green threads.

13. The computer-implemented system of claim 8, wherein the processor further processes, with the service running on the processor using any of the virtual threads of the service, the transaction, by sending data to at least one external system.

14. The computer-implemented system of claim 8, wherein the processor further processes, with the service running on the processor using any of the virtual threads of the service, the transaction by receiving data from at least one external system.

15. A system comprising: one or more computers and one or more non-transitory storage devices storing instructions which are operable, when executed by the one or more computers, to cause the one or more computers to perform operations comprising:

receiving, using a service running on a processor, a transaction that is part of a multi-part transaction, wherein the service comprises virtual threads spawned by the service and running on the processor;

determining, using the service using any of the virtual threads of the service, the transaction does not already exist in transaction state data for the service;

updating, using the service using any of the virtual threads of the service, the status of the transaction in the transaction state data for the service to pending;

processing, using the service using any of the virtual threads of the service, the transaction;

updating, using the service using any of the virtual threads of the service, the status of the transaction in the transaction state data for the service to completed;

receiving, using the service at an endpoint of the service, a request for the status of the transaction;

responding, using the service using any of the virtual threads of the service, to the request for the status of the transaction;

sending, using the service using any of the virtual threads of the service, a request for status to an endpoint of at least one other service that is processing at least one other transaction of the multi-part transaction; and receiving, using the service using at any of the virtual threads, a response from the at least one other service of a status of completed.

16. The system of claim 15, wherein the instructions which are operable, when executed by the one or more computers, to cause the one or more computers to perform operations further cause the one or more computers to perform operations comprising: receiving, using the service, a second transaction that is part of a second multi-part transaction;

determining, using the service using any of the virtual threads of the service, the second transaction does not already exist in transaction state data for the service;

updating, using the service using any of the virtual threads of the service, the status of the transaction in the transaction state data for the service to pending;

processing, using the service using any of the virtual threads of the service, the second transaction;

updating, using the service using any of the virtual threads of the service, the status of the second transaction in the transaction state data for the service to completed;

sending, using the service using any of the virtual threads, a request for status to the endpoint of the at least one other service that is processing at least one other transaction of the second multi-part transaction;

receiving, using the service using any of the virtual threads, a response from the at least one other service of a status of compensated; and rolling back, using the service using any of the virtual threads, the second transaction.

17. The system of claim 15, wherein the instructions which are operable, when executed by the one or more computers, to cause the one or more computers to perform operations further cause the one or more computers to perform operations comprising: receiving, using the service, a second transaction that is part of a second multi-part transaction;

determining, using the service using any of the virtual threads of the service, the second transaction does not already exist in transaction state data for the service;

updating, using the service using any of the virtual threads of the service, the status of the transaction in the transaction state data for the service to pending;

processing, using the service using any of the virtual threads of the service, the second transaction;

sending, using the service using any of the virtual threads, a request for status to the endpoint of the at least one other service that is processing at least one other transaction of the second multi-part transaction;

determining, using the service, that the request for status has timed out; and re-sending the request for status.

18. The system of claim 17, wherein the instructions which are operable, when executed by the one or more computers, to cause the one or more computers to perform operations further cause the one or more computers to perform operations comprising:

determining, using the service using any of the virtual threads, that a threshold number of requests for status have been sent to the at least one other service and no response to any of the requests for status have been received; and rolling back, using the service using any of the virtual threads, the second transaction.

19. The system of claim 15, wherein the virtual threads are green threads.

20. The system of claim 15, wherein the instructions which are operable, when executed by the one or more computers, to cause the one or more computers to perform operations comprising processing, using the service using any of the virtual threads of the service, the transaction, further cause the one or more computers to perform operations comprising sending data to at least one external system or receiving data from at least one external system.

* * * * *